United States Patent [19]
Gilliland et al.

[11] Patent Number: 6,061,493
[45] Date of Patent: May 9, 2000

[54] OPTICAL SUBASSEMBLY WITH ATTENUATING PLUG

[75] Inventors: Patrick B. Gilliland, Chicago, Ill.; Roger E. Weiss, Foxborough, Mass.

[73] Assignee: Methode Electronics, Inc., Chicago, Ill.

[21] Appl. No.: 09/144,714

[22] Filed: Sep. 1, 1998

[51] Int. Cl.$^7$ .................................................. G02B 6/00
[52] U.S. Cl. .............................. 385/140; 385/88; 385/92; 385/93
[58] Field of Search ................... 385/140, 88–93

[56] References Cited

U.S. PATENT DOCUMENTS

| H491 | 7/1988 | Pitruzzello et al. | 385/140 |
| 5,309,542 | 5/1994 | Strope et al. | 385/140 |
| 5,812,717 | 9/1998 | Gilliland | 385/93 |

*Primary Examiner*—Phan T. H. Palmer
*Attorney, Agent, or Firm*—David L. Newman

[57] ABSTRACT

The present invention provides in improved Transmitting Optical Subassembly (TOSA) for coupling an optical output signal from an optical transmitter to an optical fiber sheathed within a fiber optic connector ferrule. The TOSA includes a housing formed of precision molded plastic or machined metal. A first end of the housing includes an optics cavity configured to receive an optical element for emitting an optical signal. A second end of the housing is configured as a long bore configured to receive an optical fiber connector ferrule. The housing further defines a lens cavity for retaining a focusing element between the optics cavity and the ferrule receiving bore. Finally, the housing also includes an attenuator receiving aperture between the optics cavity and the ferrule receiving bore. The plug receiving aperture is configured to removably receive an attenuation plug whereby the optical output of the optical element passes through the attenuator plug and is attenuated. The present invention further provides a method of normalizing the output signal of optical transmitters by measuring the output signals of the transmitters, comparing the measured signals to a normal reference signal, and attenuating the measured signal in order to more nearly match the reference signal.

37 Claims, 8 Drawing Sheets

OPTICAL SUBASSEMBLY WITH ATTENUATING PLUG

BACKGROUND OF THE INVENTION

The present invention relates to an improved Transmitting Optical Subassembly (TOSA) used for coupling the optical output signal of an optoelectronic transmitter to an optical fiber transmission medium. More particularly, the present invention provides an improved TOSA including output normalization for adjusting the output characteristics of an optical transmitter to fit within predefined optimal parameters.

In the field of data communications, optoelectronic transceivers act as the interface between electrical and optical transmission media. Optical transmitters convert electrical data signals into optical signals which may be transferred over fiber optic cables. Conversely, optical receivers receive optical signals and convert them into electrical signals. Optical transmitters and receivers may be combined into a single device to form an optoelectronic transceiver. A key element of any optical transmitter or receiver is the optical subassembly. In the case of an optical transmitter, the optical subassembly comprises a transmitting optical subassembly, or TOSA, and in the case of an optical receiver, the optical subassembly comprises a receiving optical subassembly, or ROSA. While the present invention may include possible applications involving ROSA, the primary focus of the invention has been to provide a TOSA which acts to normalize the output characteristics of an optical transmitter, and henceforth the discussion will be limited to an improved TOSA.

A TOSA acts as the interface between an electronic data communication medium and an optical data communication medium. In fact, the TOSA occupies the physical space between the optoelectronic transmitter electrical drive circuitry and an optical fiber. The TOSA provides the physical structure to couple the optical output signal of the transmitter to an optical fiber, and acts to align and focus the optical signal onto the end of the fiber such that the light signal enters the fiber and is transmitted to a remote location where the signal can be received and converted back into an electronic signal.

Because the diameter of an optical fiber is quite small, alignment of the fiber with the optical signal is of critical importance to the operation of an optoelectronic transceiver. To facilitate alignment of the optical fiber, the end of a fiber optic cable will often be provided with a specially adapted fiber optic connector. While such connectors are offered in a variety of forms, a common fiber optic connector includes a cylindrical plastic or ceramic connector ferrule having a large diameter relative to the diameter of an optical fiber. The connector ferrule includes a narrow axial hole through which an optical fiber may be inserted and epoxied to the inside of the ferrule. The dimensional tolerances of the ferrule are extremely low such that the outer circumferential surface of the ferrule provides a fixed reference for locating the axial fiber sheathed therein. A TOSA includes cooperating structures for receiving a connector ferrule and aligning the optical fiber with an optical signal emitted by an active optical element housed within the TOSA.

A TOSA generally comprises a cylindrical housing formed of molded plastic or machined from a metal such as stainless steel. A first hollow end of the housing may have a larger diameter than the second end, and is configured to receive a focusing element and an optical package. The optical package itself generally comprises an active optical element such as an LED or a semiconductor laser mounted on a header or substrate. A protective cover including a transparent window to allow the optical signal emitted by the active optical element to radiate from the package may be provided and hermetically sealed to the header. Alternately, the active element may simply be covered by a fast curing resin. Electrical leads extend through the header such that the optical element may be electrically connected to the transmitter's drive circuitry such that data signals may be transferred to the optical element and converted to light signals.

The second end of the TOSA generally comprises a long narrow bore configured to receive a connector ferrule. At the distal end of the bore a narrow passage joins the bore to the first hollow end of the housing, allowing optical signals to pass therebetween. The bore at the second end is precision molded or machined such that the inner diameter of the bore is precisely located relative to the passage. This ensures that when a connector ferrule is inserted into the bore, the optical fiber axially positioned within the ferrule will be located directly over the center of the passage.

To complete the assembly of the TOSA, the optical package is aligned with the focusing element such that the optical signal emitted by the active optical element is focused to a narrow point of light corresponding to the position of the polished end of the optical fiber carried by the connector ferrule inserted into the ferrule receiving bore. Once proper alignment of the optical package is achieved, the optical package may be permanently attached to the TOSA housing. The TOSA may then be connected to the main body of an optoelectronic transmitter. Additional connector apparatus may be provided with the transmitter to releasably retain fiber optic connector ferrules within the TOSA.

Figure 1:
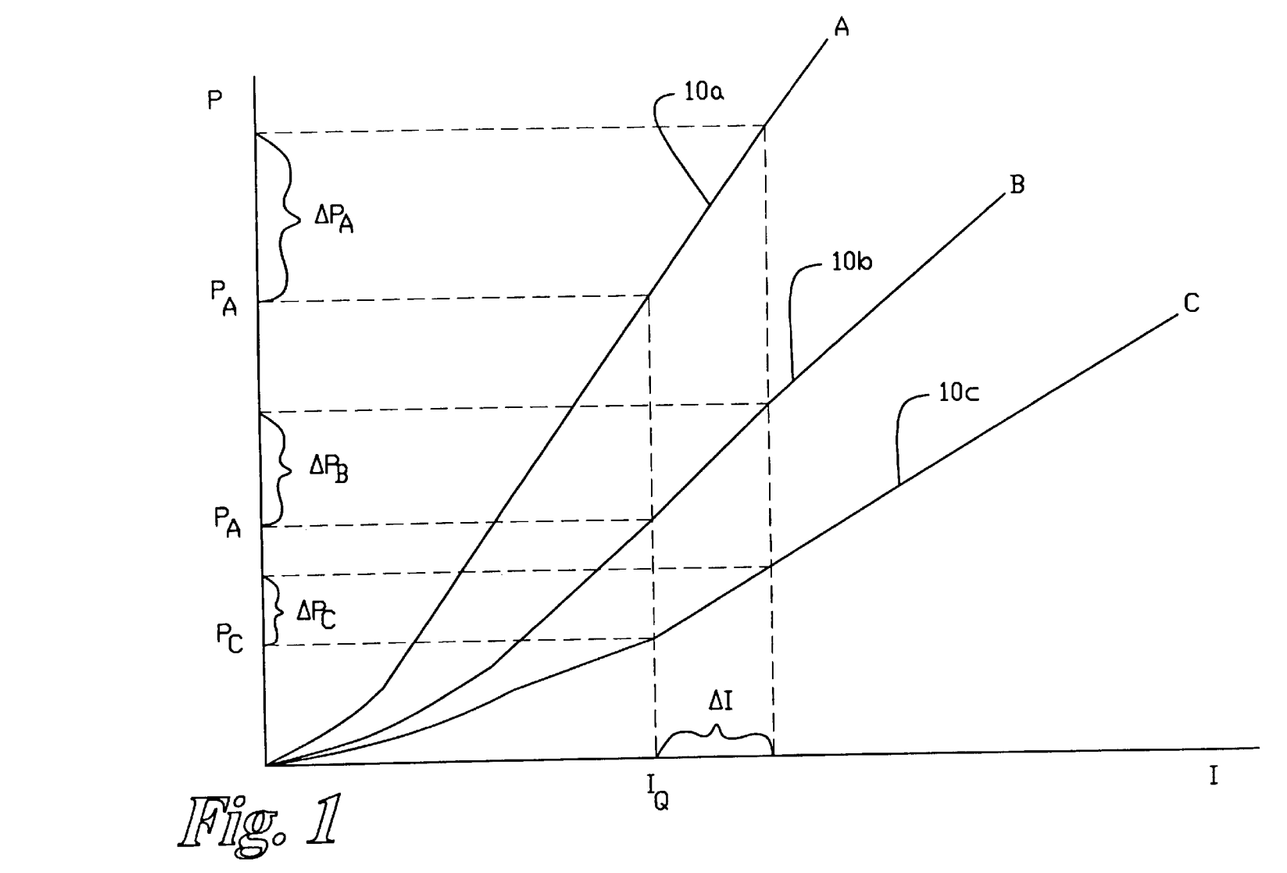
FIG. 1 shows the power versus current curves for three individual VCSELs A, B, and C.

LEDs and semi-conductor lasers are often employed as the active optical element in optoelectronic transceivers. The present invention may be employed with optical packages employing any active optical element. However semiconductor lasers, particularly vertical cavity surface emitting lasers (VCSEL) have a number of advantages over LEDs, most having to do with improved speed, efficiency, longevity and reliability. However, employing semiconductor lasers gives rise to other problems which must be addressed. One of the primary difficulties with semiconductor lasers is that each individual laser will have its own unique set of output characteristics. For example, FIG. 1 shows typical output power versus input current curves, or P-I curves, for two individual semiconductor lasers A and B. The X-axis represents the drive current input to the semiconductor lasers, and the Y-axis represents the corresponding optical output power delivered by the lasers. It should be noted that each curve includes a linear region 10a, 10b. The linear region represents the linear operating range of the laser and the slope of the linear portion represents the slope efficiency $\eta$ of the laser. Thus, $\eta = \Delta P / \Delta I$. By comparing the curves in FIG. 1 it is clear that the slope efficiencies of lasers A, and B are not the same. From the slope of the various linear segments 10a, 10b, it can be seen that $\eta_A$ is greater than $\eta_B$.

In addition to the variability in the output characteristics of individual semiconductor lasers, the output signal of a TOSA is further dependent on how well the output signal of the active optical element is coupled to the transmission medium, namely in optical fiber. FIG. 1 further includes curve C which represents the output signal of a TOSA employing the semiconductor laser having the output characteristics of curve A. By comparing curves A and C, it can be seen that due to less than 100% optical coupling the output power of the TOSA is significantly reduced for all levels of input current I. Thus, component alignment and effective output coupling have a significant impact on the TOSA output characteristics in addition to variability in the output characteristics of the active optical elements themselves.

The differences between the three curves shown in FIG. 1, including their relative heights and slope efficiencies, have a significant impact on the optical power emitted by a TOSA. For example, in FIG. 1 a uniform DC input current $I_Q$ is supplied. However, the resultant output power $P_A$, $P_B$, and $P_C$ varies widely. Furthermore, because of the differing slope efficiencies of the various curves, equal changes in the input current will result in unequal changes in the output power. Thus, for $\Delta I$ shown in FIG. 1, the resulting change in the output power $\Delta P$ of the optical signals is markedly different for each curve. In other words, as shown in FIG. 1, for a uniform $\Delta I$ applied to curves A, B, and C $\Delta P_A \neq \Delta PB \neq \Delta P_C$.

These variations in the output characteristics raise a significant barrier to designing a standard, reliable optoelectronic transceiver suitable for mass production. Ideally, each optoelectronic transceiver of a particular design will have similar output characteristics. In normal operation, the TOSA will be supplied with a DC quiescent operating current $I_Q$ modulated by a binary data signal having an amplitude $\pm \Delta I$. The output signal will comprise an optical signal having average power $P_Q$ modulated by the data signal i the amount $\pm \Delta P$. The ratio between $P_Q + \Delta P$ and $P_Q - \Delta P$ is known as the extinction ratio of the modulated optical output signal. It is desirable that every optical transmitter of a particular design have similar, if not identical output characteristics including the average output power $P_Q$ and extinction ratio. By normalizing the output characteristics of a line of optoelectronic transmitters the task of designing a reliable, interchangeable optical receiver is simplified. With optical signals having approximately the same average power and extinction ratio, it is easier for a receiver to distinguish between received binary 1's and binary 0's.

Unfortunately, each TOSA will have its own unique output characteristics. As FIG. 1 graphically demonstrates, applying a uniform input current signal to a number of different TOSAs employing unique semiconductor lasers will result in non-uniform output signals having dissimilar average power and extinction ratios. Past optoelectronic transmitters have attempted to normalize the output characteristics of individual transmitters by adjusting the input current supplied to the semiconductor laser. For example, this technique is disclosed in co-pending Patent Application Ser. No. 08/904,130 assigned to Methode Electronics, Inc. Using this approach the output characteristics of individual lasers are measured and biasing resistors within the transmitter's drive circuitry are altered to change both the quiescent current $I_Q$ and the magnitude of the modulation current $\pm \Delta I$ supplied to the lasers. By manipulating these parameters the output signal can be tailored, or normalized, to predetermined optimal levels. In other words, by adjusting the internal biasing resistors, multiple transmitters may be constructed, each having a near identical output signal including the same normalized average output power and extinction ratio.

While the method of normalizing the output characteristics of optoelectronic transceivers by altering the input current supplied to the laser is effective in achieving the desired output results, the process is time consuming and labor intensive. Furthermore, the normalization process described above does not compensate for the bandwidth versus forward current dependency exhibited by some semiconductor lasers. In some cases, it is necessary to boost the forward current supplied to a semiconductor laser to reduce the rise/fall time of the optical signal representing the transitions between binary 1's and binary 0's in order to increase the bandwidth of the transmitter. In such cases the quiescent current and quiescent output power will necessarily be higher than the desired values, and it is not possible to normalize the output signal by adjusting the input current without sacrificing bandwidth. It is desirable that like TOSAs all have the same output signal characteristics regardless of the quality of the alignment of the optical elements therein. Thus, it may be necessary to attenuate the output of a TOSA having strong output coupling to match the output of a TOSA having poor coupling of the laser output signal. Determining the necessary amount of such attenuation must necessarily take place after the optical package has been aligned with the TOSA housing and permanently attached thereto.

There is a need therefore, for a simpler and less expensive optoelectronic transmitter, having normalized output characteristics substantially matching a preset standard. Output normalization should be provided without requiring alteration to the transmitter circuitry, and should be possible at any time after an optical package has been installed and aligned with the TOSA.

SUMMARY OF THE INVENTION

The present invention relates to an improved Transmitting Optical Sub-Assembly (TOSA) for coupling the optical output signal of an optoelectronic transmitter to an optical transmission medium such as an optical fiber. The invention provides adjustable attenuation of the output signal of the TOSA in order to normalize the output power characteristics thereof. The normalization of the output signal compensates for variations in the output characteristics of various optical devices, as well as for variations in the optical coupling of the output signal to the output transmission medium. In addition to the improved TOSA, a method for normalizing the output characteristics of an optoelectronic transmitter is also provided.

In a preferred embodiment of the invention the TOSA comprises a housing adapted for receiving an optical package at a first end, and a fiber optic connector ferrule at a second end. The optical package preferably includes a semiconductor laser such as a VCSEL mounted on a header, and a protective covering over the laser. A TO can is preferred. The optical package is inserted into an optics cavity formed in the first end of the housing. The optics cavity is large enough to receive both the optical package and a focusing element. The optical package is generally mounted on a substrate which may be bonded to the end of the housing. Electrical leads extend from the substrate and may be connected to laser drive circuitry located elsewhere on the transmitter.

The second end of the housing defines an alignment bore into which a cylindrical fiber optic connector ferrule may be inserted. The connector ferrule includes an axially aligned optical fiber. At least a portion of the ferrule receiving bore is precision molded or machined to positively position the connector ferrule and the optical fiber carried therein, with the optical element inserted into the optics cavity at the opposite end of the housing.

Yet another cavity is formed within the housing between the ferrule receiving bore and the optics cavity, typically adjacent the optics cavity. This additional cavity is configured to hold the focusing element, or lens. Alternately, a focusing element may be formed integrally with the housing, between the optics cavity and the ferrule receiving bore. In either configuration, a transparent passage is formed between the optics cavity and the bore such that light may be transmitted and focused between the two.

In operation, a fiber optic connector ferrule is inserted into the ferrule receiving bore such that the polished end of the optical fiber is axially aligned with the inner passage. The laser installed within the optics cavity is driven by a modulated bias current supplied by the transmitter's laser drive circuitry. The laser outputs an optical signal having an output power level modulated according to the modulated input current signal. From the optical package the output signal is radiated toward the focusing element and the optical fiber beyond. The focusing element focuses the optical signal to a small point of light directed at the polished end of the fiber, allowing the optical signal to enter the fiber. As noted in the background of the invention, however, for a preset bias current the resultant output power of the optical signal will vary from one laser to another. Furthermore, because the slope efficiency of each laser will also vary, small changes in the input current signal resulting from the modulating data signal will cause widely disparate changes in the output power of the optical output signals of different VCSELs. Also variations in the alignment of the semiconductor laser and the focusing element between different TOSAs will cause further variations in the power of the signal actually coupled to the optical fiber. The present invention normalized these variations by placing a properly selected optical attenuator in the path of the optical signal prior to the signal entering the optical fiber.

In a first preferred embodiment of the invention, the attenuator comprises an optically lossy plug insertable into the housing. The housing includes a plug receiving aperture for receiving the attenuator plug and aligning the plug with the optical axis of the housing. When the attenuator plug is inserted into the aperture, the optical signal generated by the laser is forced to pass through the attenuator plug en route to the optical fiber carried by the connector ferrule inserted into the ferrule receiving bore at the opposite end of the housing. In this embodiment, the output signal characteristics of the TOSA are measured, and compared against an idealized standard. Depending on the magnitude of the discrepancy between the measured signal and the standard, an attenuator plug having predetermined optical loss characteristics may be selected to attenuate the measured signal sufficiently to bring the measured signal in line with the standard. Thus, optoelectronic transmitters may be produced in quantity without regard to the operating characteristics of the particular laser employed. The laser drive circuitry may be fixed to supply a set DC bias current regardless of the operating parameters of the particular laser contained with the TOSA. By properly attenuating the output signal, mass produced transmitters may be manufactured, each having similar, or normalized, output signals, regardless of the output characteristics of any particular laser.

In another embodiment, the attenuator plug is replaced by an attenuator bar insertable into the output signal path from outside the TOSA. The attenuator bar is formed of an optically lossy material similar to the plug of the first embodiment. The attenuation of the bar may be varied by changing the thickness of the bar along the signal path.

In a third embodiment, the optically lossy attenuator may be incorporated directly with the focusing element. In this embodiment, a surface of the focusing element, preferably a ball lens, is coated with a partially reflective coating. The magnitude of the reflectivity may be selected based on the amount of attenuation required to bring the measured output signal of a particular laser in line with the normal signal idealized standard. The reflectivity of the coating may be determined by the composition of the coating as well as the density with which it is applied. The coating preferably comprises a neutral density metal such Inconel applied to the focusing element via vapor deposition.

In each embodiment it is preferred that the optical loss of the attenuator is selected such that the optical signal output by the VCSEL may be attenuated in the range between 0 db and −10 db. Particularly preferred embodiments include attenuators having attenuation of −3 db and −6 db.

The present invention further includes a method for normalizing the output signals of optoelectronic transmitters employing laser as the active optical element. The method includes the steps of applying a plurality of test currents to a laser and measuring the output signals generated in response thereto in order to determine the output characteristics of the laser. The measured output characteristics are then compared to the output characteristics of the desired normal signal. An attenuation factor is calculated based on the differences between the measured output characteristics and the output characteristics of the normal signal. The attenuation factor represents a percentage by which the measured output signal of the laser must be attenuated such that the output characteristics of the attenuated signal will more closely resemble the output characteristics of the desired normal signal. An optically lossy attenuator having the necessary attenuation is then placed in the path of the transmitter output signal. The resultant attenuated signal will more closely match the desired output characteristics of the normal signal.

DETAILED DESCRIPTION OF THE PREFERRED EMBODIMENTS

The present invention relates to an improved Transmitting Optical Subassembly (TOSA) configured to facilitate power normalization of the optical output signals of optoelectronic transmitters employing active optical elements such as LEDs, or semiconductor lasers. The invention is particularly well adapted for use with vertical cavity surface emitting lasers (VCSEL). The TOSA of the present invention may be selectively configured to compensate for variations in the output power to input current ratio (P/I) and slope efficiency (η) of individual optical elements and output coupling variations among TOSAs so that the operating characteristics of similarly designed transmitters may be normalized to fall within a certain predetermined range.

Figure 3:
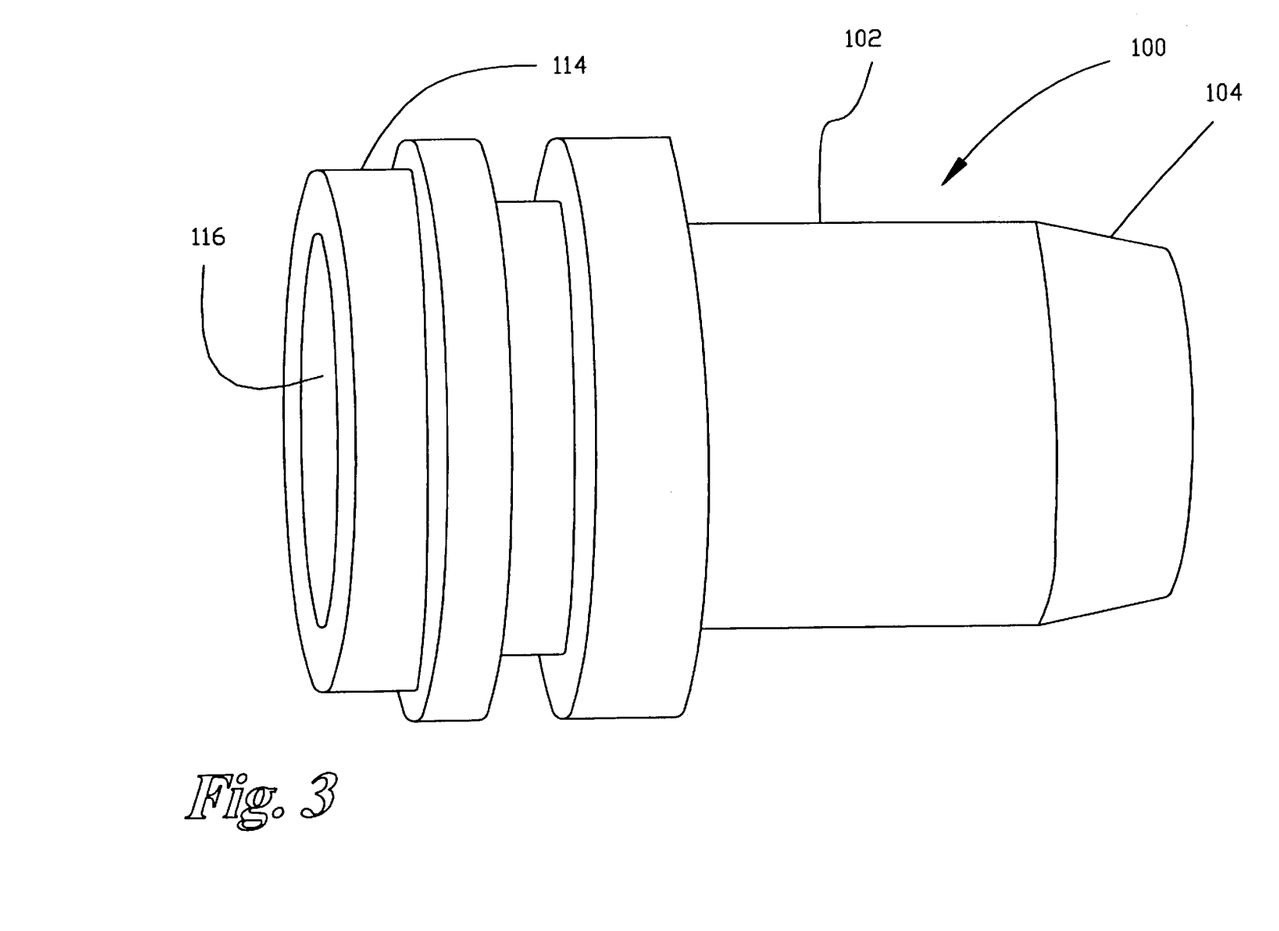
FIG. 3 is a perspective view of a Transmitting Optical Subassembly (TOSA) according to a first embodiment of the present invention.
Figure 4:
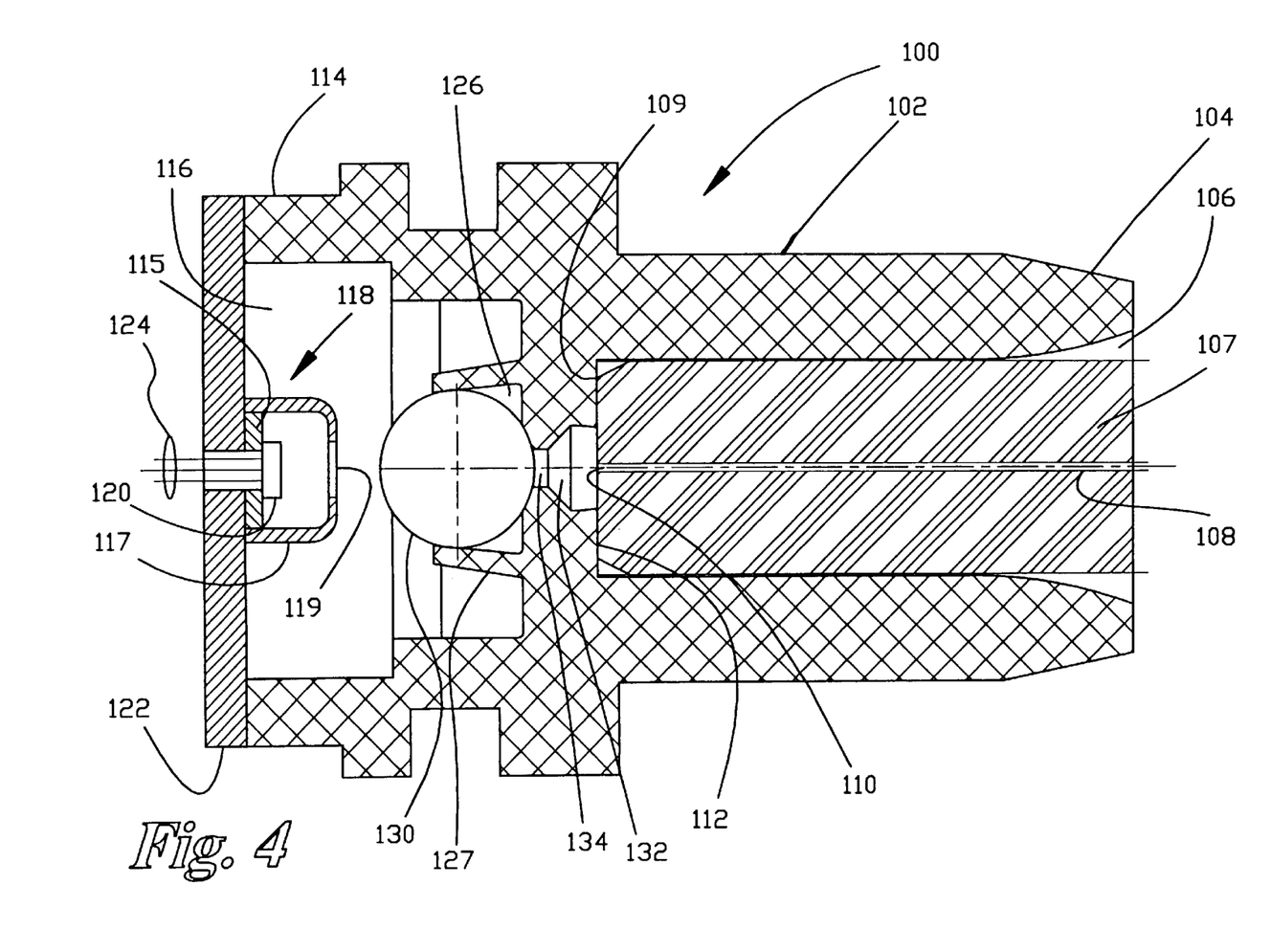
FIG. 4 is a cross section of the TOSA of FIG. 3 taken along the centerline of the housing.

Referring to FIGS. 3 and 4, a TOSA according to a first embodiment of the invention is shown at 100. The TOSA includes a housing 102 which may be formed of a precision molded plastic such as Vectra, or a machined metal such as stainless steel. Housing 102 includes a first end 104 which defines a bore 106. Bore 106 is configured to receive a fiber optic connector ferrule 107. Fiber optic connector ferrules are well known in the art, and comprise a precisely dimensioned ceramic or plastic cylinder surrounding an optical fiber. The precise outer diameter of the connector ferrule allows the optical fiber within the ferrule to be very accurately and repeatably located relative to corresponding alignment structures such as a mating connector, or, as in the present case, the ferrule receiving bore 106 of TOSA 100. In FIG. 4 a connector ferrule 107 housing an optical fiber 108 is shown inserted into ferrule receiving bore 106. As shown, the transverse end 109 of ferrule 107 abuts a small shoulder 112 located at the distal end of bore 106. Shoulder 112 acts as a ferrule stop, preventing further insertion of the ferrule 107 into the bore 106.

Housing 102 further includes a second end 114 which defines an optics cavity 116. The optics cavity 116 is configured to receive an optical package 118, such as a TO can, which includes an active optical element such as an LED or semiconductor laser 120. A VCSEL is the preferred active optical element, and although LEDs and other semiconductor lasers may be employed, the active optical element will be referred to as a VCSEL hereafter. The optical package 118 is generally self contained with the VCSEL 120 mounted to a small header 115 and a protective covering 117 mounted over the header. The protective cover includes a transparent window 119 allowing the optical signal emitted by the VCSEL to radiate from the optical package 118. Optical package 118 further includes electrical leads 124 extending from header 115. Leads 124 allow the VCSEL to be connected to laser drive circuitry located elsewhere on a transceiver assembly. The optical package 118 will generally be permanently mounted on an alignment substrate 122. The alignment substrate allows the optical package 118 to be actively aligned to maximize the output signal coupled to the optical fiber 108. When the optical package is properly aligned, the optical signal emitted by the VCSEL is focused to a narrow point of light coinciding with the position of the polished end 110 of optical fiber 108. If the laser 120 is misaligned with the optical fiber 108, the signal power coupled to the fiber will be reduced. Since the degree of misalignment will vary from TOSA to TOSA, the percentage of the output signal which is effectively coupled to the optical fiber will vary from TOSA to TOSA as well. Therefore the optical signal strength of different TOSAs will not be consistent.

Also included within optics cavity 116 is a smaller internal cavity 126 for receiving a focusing element or lens 130. In the preferred embodiment, lens 130 comprises a spherical ball lens. The lens cavity 126 is formed within housing 102 between the optics cavity 116 and the ferrule receiving bore 106. The lens cavity 126 may be formed with lens retention structures configured to hold the lens within the lens cavity. Such lens retention features may include compressible protuberances lining the opening to the cavity, or angled support walls 127 as shown in FIG. 4. An internal passage 134 connects the lens cavity 126 to the ferrule receiving bore 106 such that an optical signal may be transmitted from the optics cavity through the ball lens 130 to the ferrule receiving bore 106. When the optical package is properly aligned, the VCSEL 120, the ball lens 130, and the optical fiber 108 define an optical axis extending through the assembled TOSA 100.

An attenuator cavity 132 is formed within housing 102 between the ferrule receiving bore 106 and the lens cavity 126. The attenuator cavity opens toward ferrule receiving bore 106, and partially defines the shoulder 112. However, the attenuator cavity 132 may be alternately arranged to open toward the lens cavity, though it should be noted that in the alternate arrangement, the optical package 118 and ball lens 130 must be removed to gain access to the attenuator cavity 132 for purposes of changing an attenuator plug 136 inserted therein, an thus the attenuation may not be varied to compensate for poor coupling of the VCSEL output signal.

Figures 5, 6, 7C:
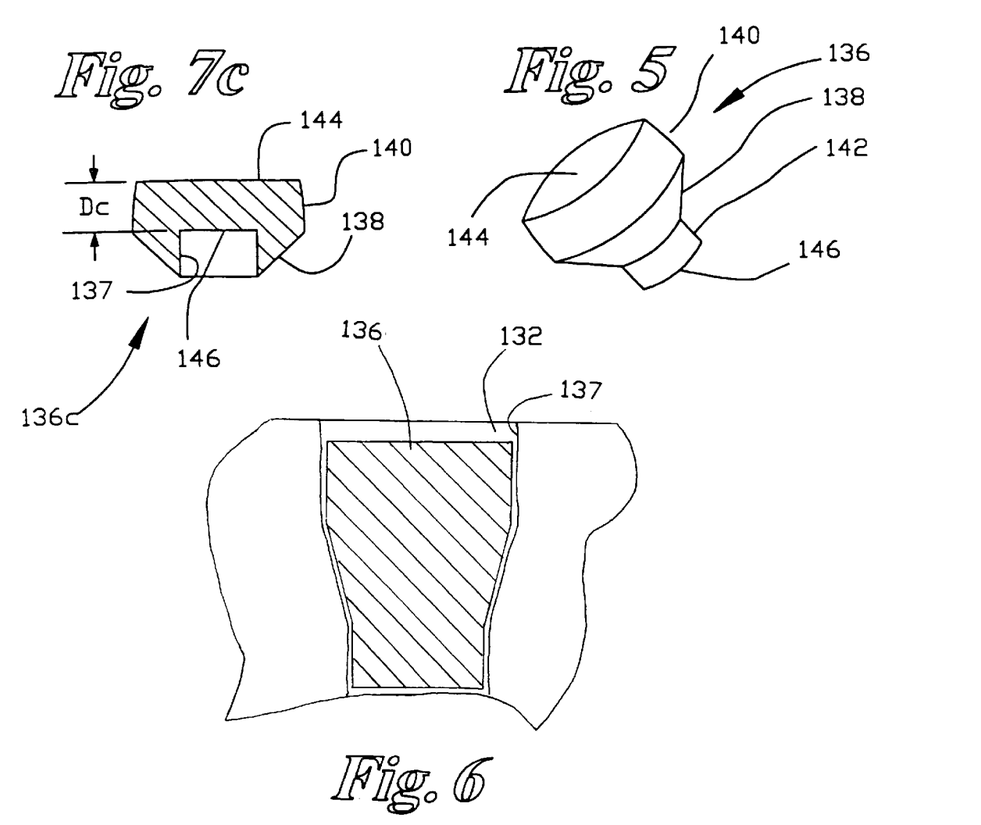
FIG. 5 shows a perspective view of an attenuator plug according to the preferred embodiment of the present invention.
FIG. 6 is a blown up cross section of an attenuator plug insert within the TOSA housing of FIG. 4.
FIG. 7c is a cross section of an attenuator for use in the TOSA of FIG. 3 having a third attenuation value.

Referring now to FIGS. 5 and 6, an attenuator plug is shown at 136. The attenuator plug is configured to be inserted into attenuator cavity 132 as shown in FIG. 6. Plug 136 is configured to mate with the contours of the attenuator cavity. Attenuator cavity 132 may be formed with slightly inwardly inclined walls 137, and attenuator 136 may be press fit into cavity 132 such that inclined walls 137 will engage the upper surface 144 of attenuator plug 136 and retain plug 136 within cavity 132. Attenuator plug 136 includes a truncated conical mid section 138 separating a first short cylindrical section 140, and a second short cylindrical section 142. Attenuator 136 is formed of an optically lossy material such that an optical signal entering the attenuator substantially perpendicular to the first transverse surface 146 will exit the attenuator at the second transverse surface 144 having its signal power measurably reduced. The optical losses engendered by the attenuator plug may be of a reflective, scattering, absorptive, or refractive nature depending on the material used in forming the attenuator. In the preferred embodiment, attenuator plug 136 is preferably formed of an absorptively lossy plastic material such as ULTEM, an amber engineered plastic having stable temperature characteristics.

Attenuator plug 136 presents an optically lossy barrier through which the optical output signal of VCSEL 120 must pass prior to being coupled to optical fiber 108. A portion of the output power of the signal passing through attenuator plug 136 is absorbed such that the actual signal power that is coupled to the optical fiber is less than that actually output by the VCSEL. The optical properties of plug 136 are uniform throughout such that the amount of attenuation of the output signal will depend on the amount of attenuating material in the path of the signal. In other words, the attenuation of plug 136 will be directly related to the thickness of the plug in the area crossing the optical axis of the TOSA.

Figure 7A:
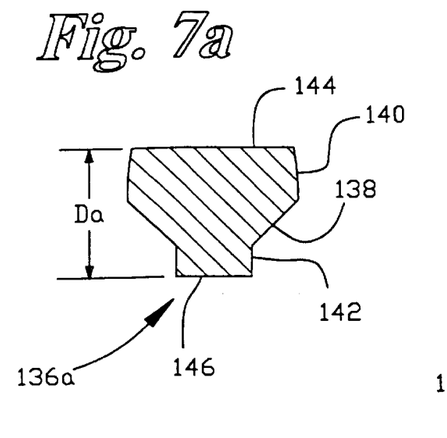
FIG. 7a is a cross section of an attenuator for use in the TOSA of FIG. 3 having a first attenuation value.
Figure 7B:
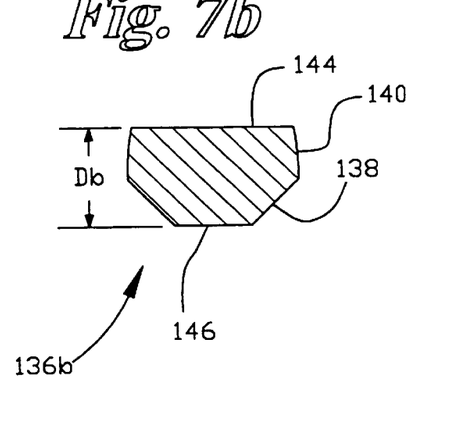
FIG. 7b is a cross section of an attenuator for use in the TOSA of FIG. 3 having a second attenuation value.

An advantage of the present design is that multiple attenuation plugs 136 may be produced having varying degrees of attenuation. Since the amount of attenuation supplied by a particular plug 136 will be determined by the thickness of the plug crossing the optical output signal, the attenuation may be easily manipulated by varying the thickness of the plug. With reference to FIGS. 7a, 7b, and 7c, three separate attenuator plugs are shown in cross section at 136a, 136b and 136c. Plug 136a represents the cross section of the plug shown in perspective view in FIG. 5. Each of the plugs 136a, 136b, and 136c share common features which are marked with common reference numbers. Each comprises a first short cylindrical section 140, a conical mid-section 138 and transverse surfaces 144,146 on each end of the plug. A distance Da, Db and Dc is defined by the distance between surfaces 144, 146 for each plug 136a, 136b and 136c. The distance D, represents the thickness of the plug and therefore defines the attenuation of the plug. Plug 136a includes second short cylindrical section 142. This added material has the effect of increasing Da and thereby increasing the attenuation of plug 136a. Comparing plug 136b, second cylindrical portion 142 has been removed, and transverse surface 146 is located directly adjacent conical section 138. Thus, the thickness Db for plug 136b is less than Da, 136a, and the attenuation of plug 136b will be less than that of plug 136a. Finally, turning to FIG. 7c, a cylindrical section of material has been removed from the lower reaches of plug 136c, leaving a bore 137. Transverse surface 146 is located at the distal end of bore 137 much closer to the opposite transverse surface 144, than in plugs 136a and 136b. Thus, the distance Dc is less than both Da and Db, and the attenuation of plug 136c is likewise less than that of plugs 136a and 136b. Therefore, turning back to FIG. 6, by inserting an attenuator plug according to 136a, 136b, or 136c into cavity 132 the attenuation of the TOSA may be variably modified Prior to the final assembly of individual TOSAs, the characteristics of the output signal, including the output characteristics of the semiconductor laser and the quality of the signal coupling of the TOSA itself, are measured and compared to the output characteristics of a normalized reference signal. Based on the results of the comparison, an attenuation factor may be calculated whereby the measured output signal, attenuated by an amount equal to the attenuation factor, will exhibit output characteristics similar to those of the reference signal. Once the attenuation factor has been calculated, an attenuation plug providing attenuation approximately equal to the calculated attenuation factor may be selected and inserted into the attenuation plug cavity 132 of the TOSA. By properly attenuating the output signal of the TOSA, the output characteristics of the net signal radiated from the TOSA will approximate the output characteristics of the normal reference signal.

Figure 2:
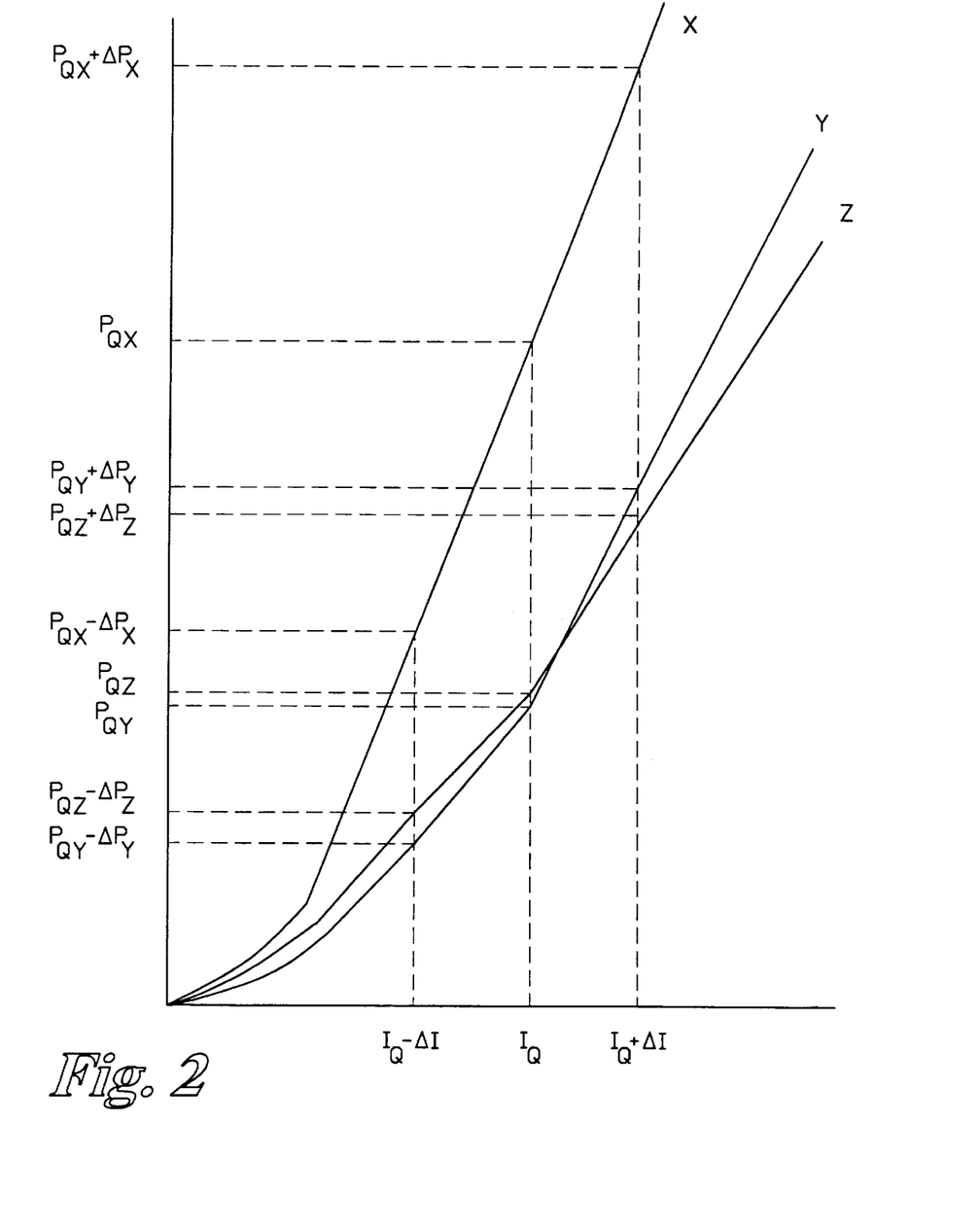
FIG. 2 shows the power v. current curve for a single VCSEL along with the P-I curve for an ideal reference signal and the P-I curve for the first signal, normalized according to the present invention.

As an example, FIG. 2 shows three separate P-I curves, X, Y, and Z. Curve X represents the power v. current (P-I) curve measured for an unattenuated TOSA. Curve Y represents the P-I curve for the desired normal reference signal. Finally, curve Z represents the P-I curve of the net attenuated output signal of the TOSA. Among the other parameters shown in FIG. 2, $I_Q$ represents the quiescent operating current of the data signal driving the TOSA, and the quantity $\pm\Delta I$ represents the change in current of the modulated data current signal, with $I_Q+\Delta I$ corresponding to a binary 1, and $I_Q-\Delta I$ corresponding to a binary 0. Similarly, the quantity $P_Q$ represents the quiescent power of the optical signal delivered by the TOSA, and the quantities $\pm\Delta P$ represent the modulated output signal. The quantity $P_Q+\Delta P$ corresponds to a binary 1 and $P_Q-\Delta P$ corresponds to a binary 0. The ratio between $(P_Q+\Delta P)$ and $(P_Q-\Delta P)$ equals the extinction ratio of the optical output signal.

As can be seen in FIG. 2, the quiescent output power $P_{QX}$ of the measured output signal is approximately twice the quiescent output power $P_{QY}$ of the normal reference signal Y. Similarly, the output power levels $P_{QX}+\Delta P_X$ and $P_{QX}-\Delta P_X$ are roughly twice the corresponding output power levels $P_{QY}+\Delta P_Y$ and $P_{QY}-\Delta P_Y$ of the normal reference signal Y. From this comparison, it can be determined that curve X will approximate curve Y if the output power of the TOSA is reduced by 50% across the entire operating range of the TOSA. Curve Z represents the P-I curve of just such a signal. To obtain the P-I curve Z, a −3 db attenuator is placed in the path of the output signal which generated curve X. Throughout the entire operating range of the TOSA, the output power of the optical signal is reduced by half. Thus, $P_{QZ}=\frac{1}{2}P_{QX}$; $P_{QZ}+\Delta P_Z=\frac{1}{2}(P_{QX}+\Delta P_X)$; and $P_{QZ}-\Delta P_Z=\frac{1}{2}(P_{QX}-\Delta P_X)$. The resultant curve Z, though not identical to the normal reference curve Y, has characteristics closely resembling those of the normalized curve. Thus, $P_{QZ}\approx P_{QY}$; $(P_{QZ}+\Delta P_Z)\approx(P_{QY}+\Delta P_Y)$; and $(P_{QZ}-\Delta P_Z)\approx(P_{QY}-\Delta P_Y)$. In other words, the quiescent output power and extinction ratio of the attenuated signal are more nearly matched to the output characteristics of the normal reference signal represented by curve Y.

Figure 8:
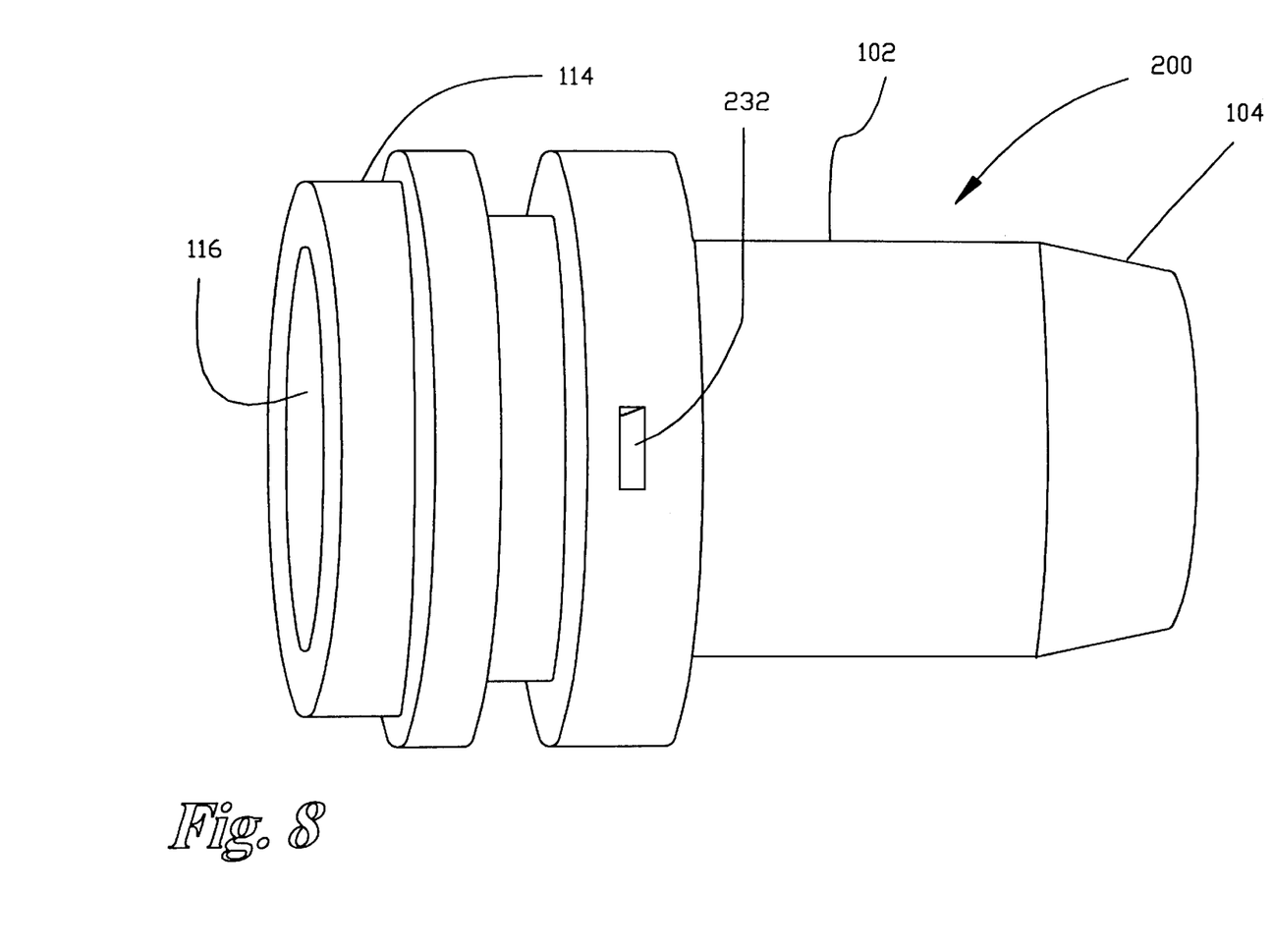
FIG. 8 is a perspective view of a TOSA according to a second embodiment of the invention.
Figure 9:
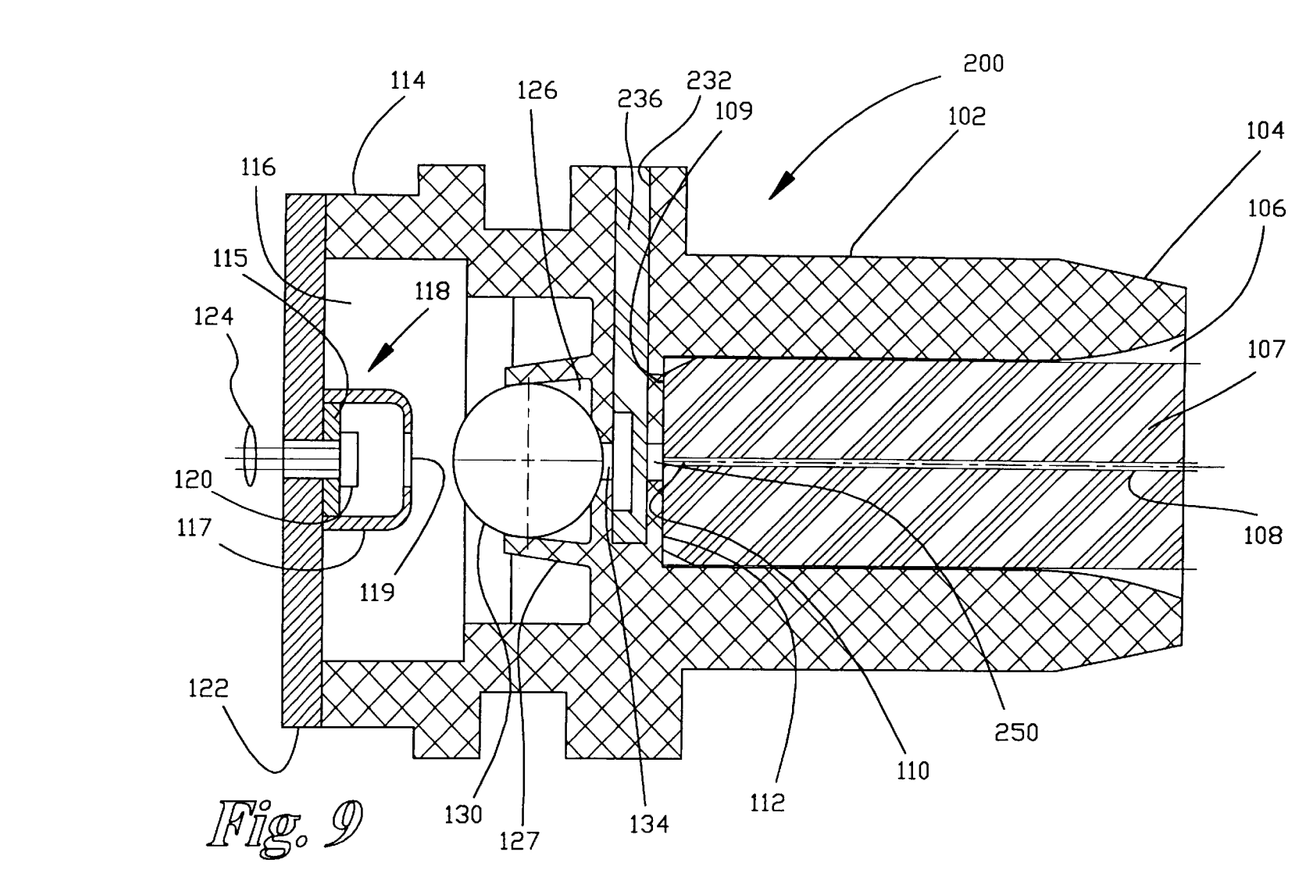
FIG. 9 is a cross section of the TOSA of FIG. 8.
Figure 10:
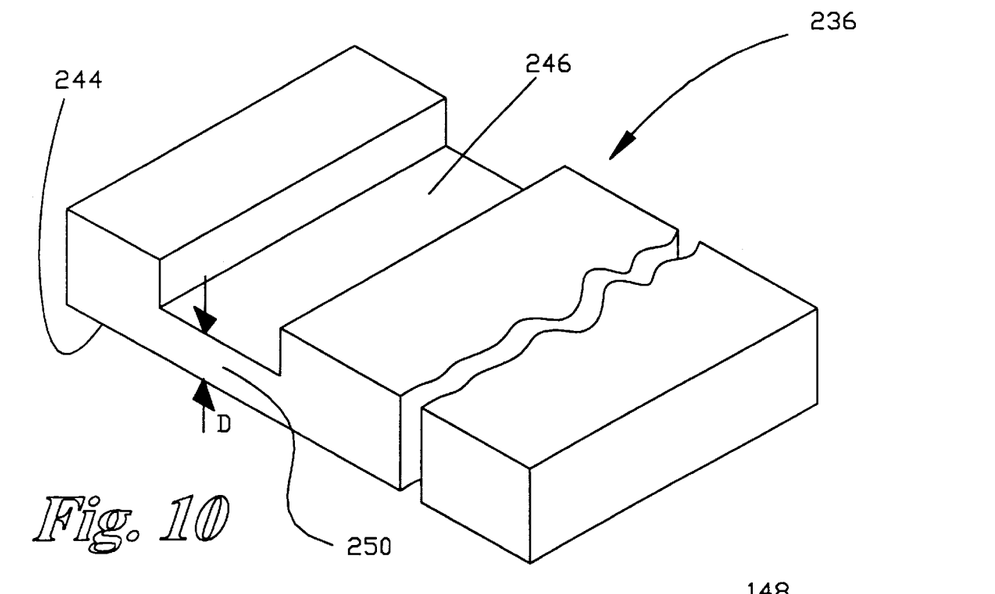
FIG. 10 is a perspective view of the attenuation bar for use with the TOSA of claim 8.

Turning to FIGS. 8 and 9, a second embodiment of a TOSA according to the present invention is shown at 200. TOSA 200 is nearly identical to TOSA 100 of the previous embodiment and like elements have been given like reference numbers. The primary difference between the first and second embodiments is that attenuator cavity 132 (see FIG. 4) is replaced by attenuator slot 232. Slot 232 extends internally from the outer circumference of the housing 102 across passage 134. Rather than a plug, an attenuator bar 236 is adapted to be insertable into slot 236 and across passage 134. When inserted into slot 232, the attenuation bar 236 thereby extends across the path of the optical output signal emitted by optical package 118. As with plug 136, attenuator bar 236 (see FIG. 10) is formed of an optically lossy material, and an absorptive material such as ULTEM is preferred. Again, the amount of attenuation will be determined by the thickness of the material crossing the path of the optical signal. Therefore, calibrated section 250 may be provided where the distance D between first surface 244 and a second surface 246 may be controlled. By controlling the distance D of calibrated section 250 the attenuation of bar 236 may be controlled. Thus, a number of bars 236 may be provided having different thicknesses D and therefore providing varying amounts of attenuation. As with the previous embodiment, the output characteristics may be measured with no attenuator present, and an attenuation factor may be calculated for normalizing the output signal. An attenuator bar 236 having the proper attenuation may then be selected and inserted into slot 232. A press fit, or epoxy, or some other bonding method may be employed to retain attenuator bar 236 within slot 232. When fully inserted, the calibrated section 250 of attenuator bar 236 extends across the optical axis of TOSA 200 attenuating and normalizing the optical output signal thereof.

Figure 11:
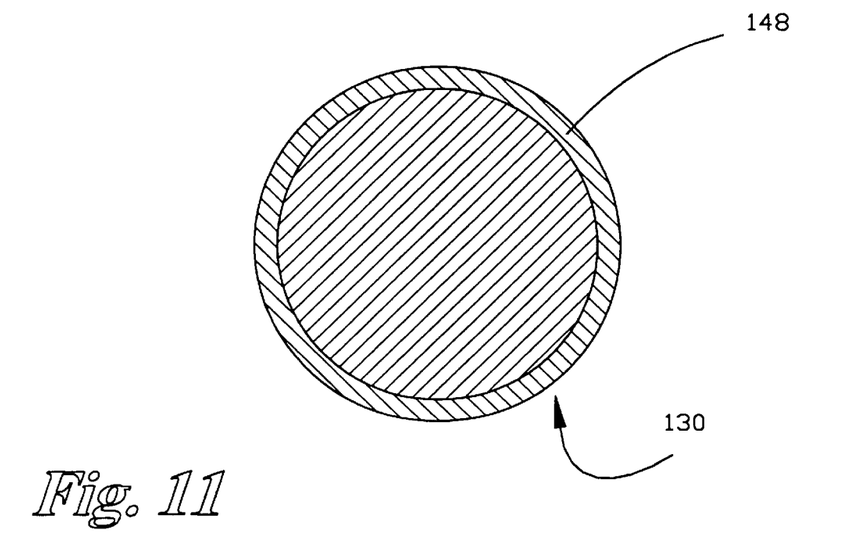
FIG. 11 is a cross sectional view of a ball lens according to a third embodiment of the invention.

In a third embodiment of the invention, a TOSA 100 is identical to that shown in FIGS. 3 and 4, except that a separate attenuator is omitted completely. In this embodiment, the attenuator for normalizing the output power of the TOSA is incorporated directly with the focusing element 130 as shown in FIG. 11. Rather than inserting a separate attenuator plug as in the previous embodiment, a surface of the focusing element 130 may be coated with a partially reflective material 148 which prevents a portion of the output signal from passing through the lens. A preferred coating comprises a neutral density metal, such as Inconel, applied to the ball lens by vapor deposition. As with the previous embodiment, the amount of attenuation provided by such a reflective coating may be manipulated by controlling various characteristics of the partially reflective coating applied to the lens. For example, the reflectivity of the lens may be manipulated by altering the thickness of the coating applied to the lens.

Several ball lenses 130 may be precoated having varying degrees of reflectivity and therefore varying attenuation. Individual lasers may be tested as described above. Then depending on the difference between the measured signal and the desired signal, a partially reflective lens having a coating of the proper thickness to attenuate the signal sufficiently such that the attenuated output power falls within an acceptable range may be inserted into the TOSA.

In addition to the apparatus described above, the present invention also includes a method for normalizing the output power characteristics of TOSA employing lasers as the active optical element. The method includes the steps of applying a predefined DC bias current to a semiconductor laser such as a VCSEL. The laser will emit a DC optical signal in response to the bias current, with the signal power being directly proportional to the applied DC bias current. The output power of the signal emitted by the VCSEL is measured and compared to an idealized standard which represents the desired output power level corresponding to the applied input current. By comparing the measured versus ideal power levels, the amount of attenuation necessary to reduce the measured output signal power to the idealized standard is determined. An attenuator is then placed in the path of the optical output signal in order to reduce the actual output of the laser by an amount equal to the difference between the originally measured signal power and the idealized standard.

In accordance with the method of the present invention, the step of placing an attenuator in the path of the optical output signal emitted by the VCSEL may include placing a partially reflective focusing element in the path of the signal, or a separate optically lossy attenuator plug. In either case the transparency of the attenuating device may be controlled to provide a desired level of attenuation. In any case, it is preferred that the attenuating device should be capable of attenuating optical signals from between 0 db to −10 db. Particular embodiments are preferred wherein the attenuation equals −1 db, −2 db and −3 db.

It should be noted that various changes and modifications to the present invention may be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

What is claimed is:

1. A Transmitting Optical Subassembly (TOSA) for coupling an optical signal from an optical transmitter to an optical fiber, the TOSA comprising:

a housing having a first end defining an optics cavity configured to receive an optical element for emitting said optical output signal, the optical element being driven by said optical transmitter, and a second end defining a receiving bore configured to receive said optical fiber;

the housing further defining a lens cavity disposed between the optics cavity and the receiving bore;

a focusing element disposed within the lens cavity;

the housing further defining an attenuator-receiving aperture between the optics cavity and the receiving bore;

an optically lossy attenuator plug removably insertable into the attenuator-receiving aperture whereby said optical output signal passes through the plug and is attenuated wherein said attenuator-receiving aperture includes a retention feature for retaining the attenuator plug therein.

2. The TOSA of claim 1 wherein the attenuator comprises a generally cylindrical plug having first and second transverse surfaces oriented substantially perpendicular to the optical output signal.

3. The TOSA of claim 2 wherein said first and second transverse surfaces are substantially flat.

4. The TOSA of claim 3 wherein the attenuation plug further comprises partially tapered sidewalls between the first and second transverse surfaces.

5. The TOSA of claim 4 wherein the plug receiving aperture defines an attenuator cavity having a complementary shape with respect to the attenuation plug, and further comprising means for retaining the plug within the attenuator cavity.

6. The TOSA of claim 1 wherein the attenuator comprises a bar insertable into said housing, said bar including first and second transverse surfaces oriented substantially perpendicular to the optical output signal.

7. The TOSA of claim 6 wherein said first and second surfaces define an attenuator width, said width defining the amount of attenuation provided by said attenuator.

8. The TOSA of claim 1 wherein the optically lossy attenuator has optical loss characteristics selected to attenuate the optical output signal in the range between 0 db to −10 db.

9. The TOSA of claim 1 wherein the attenuator attenuates the optical output signal −1 db.

10. The TOSA of claim 1 wherein the attenuator attenuates the optical output signal approximately −3 db.

11. The TOSA of claim 1 wherein the attenuator attenuates the optical output signal approximately −6 db.

12. The TOSA of claim 1 wherein the retention feature includes the attenuator receiving aperture having partially tapered sidewalls complimentary in shape to the attenuator.

13. A TOSA (Transmitting Optical Subassembly) comprising:

a housing having a first end defining an optical fiber receiving bore, and a second end defining an optics cavity, and an axial passage allowing light to pass between the receiving bore and the optics cavity;

a focusing element disposed within the housing; and an optically lossy attenuator disposed between the receiving bore and the optics cavity for partially blocking light passing between the receiving bore and the optics cavity and the attenuator including a retention feature for retaining the attenuator within the housing.

14. The TOSA of claim 13 wherein the means for blocking light comprises a partially reflective coating applied to a surface of the focusing element.

15. The TOSA of claim 14 wherein the reflective coating comprises a neutral density metal applied to the surface of the focusing element by vapor deposition.

16. The TOSA of claim 15 wherein the neutral density metal coating comprises Inconel.

17. The TOSA of claim 13 wherein the optically lossy means for blocking light comprises an attenuator removably insertable into the housing.

18. The TOSA of claim 17 wherein the attenuator further comprises a molded plastic plug.

19. The TOSA of claim 13 wherein the retention feature includes the attenuator having partially tapered sidewalls complimentary in shape to an attenuator receiving cavity.

20. A method for adjusting the optical output power and slope efficiency of a vertical cavity surface emitting laser transmitter comprising the steps of:

applying a known DC bias current to the laser to generate an optical output signal;

measuring the power of the optical signal generated in response to the applied DC bias current;

comparing the measured optical output power to a reference output power level;

determining an attenuation level required to reduce the measured optical output power to match the reference output power level; and removably placing an optically lossy attenuator in the path of the optical output signal, the attenuator having a mechanical retention feature and sufficient optical loss to attenuate the optical output signal to match the reference output power level.

21. The method of claim 20 further including the step of providing a focusing element and coating a surface of the focusing element with a reflective coating.

22. The method of claim 21 wherein the step of coating a surface of the attenuator comprises applying a neutral density metal to the surface via vapor deposition.

23. The method of claim 22 wherein the step of coating the surface of the attenuator comprises applying an Inconel coating.

24. The method of claim 20 wherein the step of placing an optically lossy attenuator in the path of the output signal comprises placing a molded plastic plug in the path of the optical output signal.

25. The method of claim 20 wherein the mechanical retention feature includes the attenuator having partially tapered sidewalls complimentary in shape to an attenuator receiving cavity and the method further comprising frictionally inserting the attenuator within the attenuator receiving cavity so that the partially tapered sidewalls abut a complimentary sidewall of the attenuator receiving cavity.

26. A Transmitting Optical Subassembly (TOSA) for coupling an optical signal from an optical transmitter to an optical fiber, the TOSA comprising:

a housing having a first end defining an optics cavity configured to receive an optical element for emitting said optical output signal, the optical element being driven by said optical transmitter, and a second end defining a receiving bore configured to receive said optical fiber;

the housing further defining an attenuator-receiving aperture between the optics cavity and the receiving bore;

an optically lossy attenuator plug removably insertable into the attenuator receiving aperture whereby said optical output signal passes through the plug and is attenuated wherein the attenuator comprises a generally cylindrical plug having partially tapered sidewalls complimentary in shape to the attenuator receiving aperture and second transverse surfaces oriented substantially perpendicular to the optical output signal.

27. The TOSA of claim 26 wherein the attenuator comprises a generally cylindrical plug having first and second transverse surfaces oriented substantially perpendicular to the optical output signal.

28. The TOSA of claim 27 wherein said first and second transverse surfaces are substantially flat.

29. The TOSA of claim 28 wherein the attenuation plug further comprises partially tapered sidewalls between the first and second transverse surfaces.

30. The TOSA of claim 29 wherein the plug receiving aperture defines an attenuator cavity having a complementary shape with respect to the attenuation plug, and further comprising means for retaining the plug within the attenuator cavity.

31. The TOSA of claim 26 wherein the attenuator comprises a bar insertable into said housing, said bar including first and second transverse surfaces oriented substantially perpendicular to the optical output signal.

32. The TOSA of claim 31 wherein said first and second surfaces define an attenuator width, said width defining the amount of attenuation provided by said attenuator.

33. The TOSA of claim 26 wherein the optically lossy attenuator has optical loss characteristics to selected attenuate the optical output signal in the range between 0 db to −10 db.

34. The TOSA of claim 26 wherein the attenuator attenuates the optical output signal −1 db.

35. The TOSA of claim 26 wherein the attenuator attenuates the optical output signal approximately −3 db.

36. The TOSA of claim 26 wherein the attenuator attenuates the optical output signal approximately −6 db.

37. The TOSA of claim 26 wherein the retention feature provides for frictional engagement with the attenuator receiving aperture.

* * * * *